(No Model.)  2 Sheets—Sheet 1.
P. T. CRAMER.
SHIPPING TRAY.
No. 347,324. Patented Aug. 17, 1886.
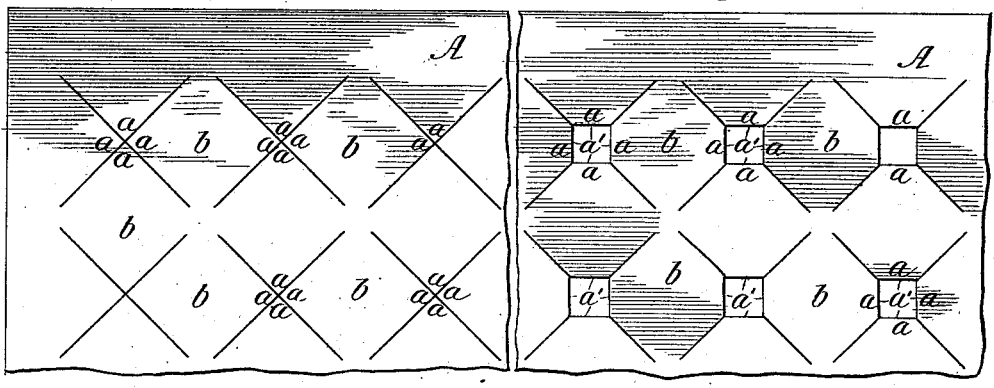
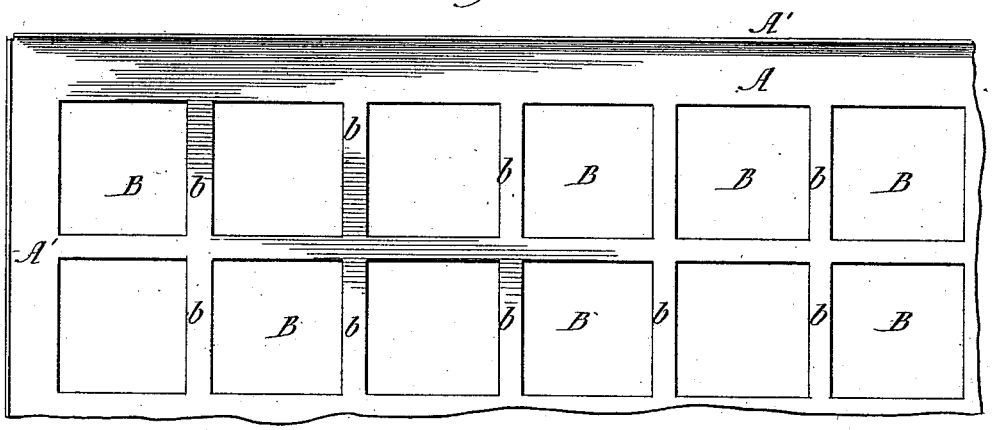
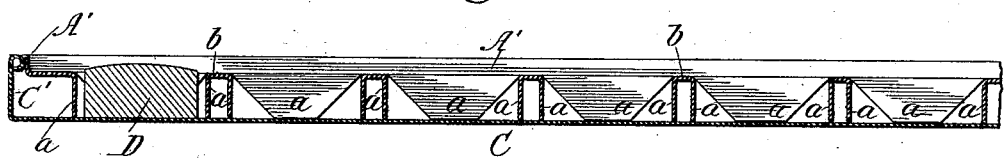
Witnesses
Albert H. Adams.
Harry T. Jones.
Inventor:
Peter T. Cramer (No Model.) 2 Sheets—Sheet 2.

P. T. CRAMER.
SHIPPING TRAY.

No. 347,324. Patented Aug. 17, 1886.

Witnesses:
Albert H. Adams.
Harry T. Jones.

Inventor:
Peter T. Cramer

UNITED STATES PATENT OFFICE.

PETER T. CRAMER, OF CHICAGO, ILLINOIS.

SHIPPING-TRAY.

SPECIFICATION forming part of Letters Patent No. 347,324, dated August 17, 1886.

Application filed May 20, 1886. Serial No. 202,700. (No model.)

*To all whom it may concern:*

Be it known that I, PETER T. CRAMER, residing at Chicago, in the county of Cook and State of Illinois, and a citizen of the United States, have invented a new and useful Improvement in Shipping and Holding Trays for Candies, of which the following is a full description, reference being had to the accompanying drawings, in which—

Figure 5:
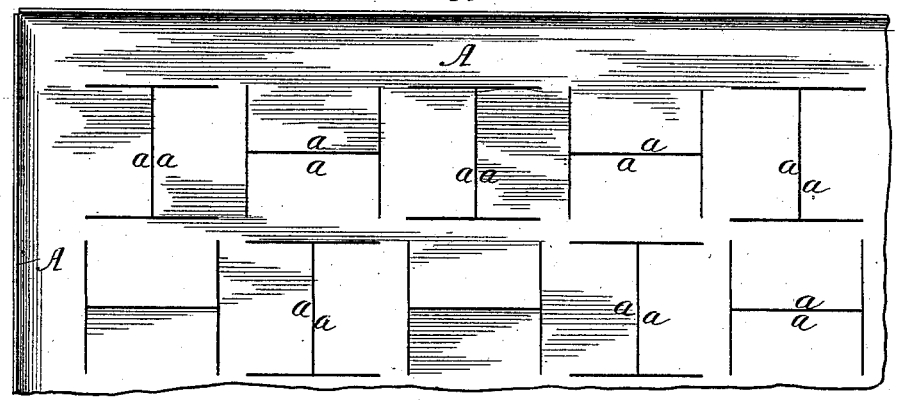
Figure 6:
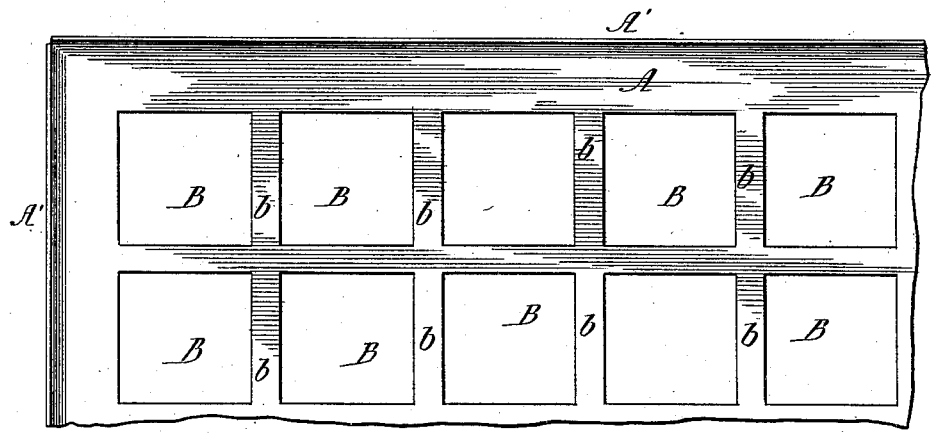
Figure 7:
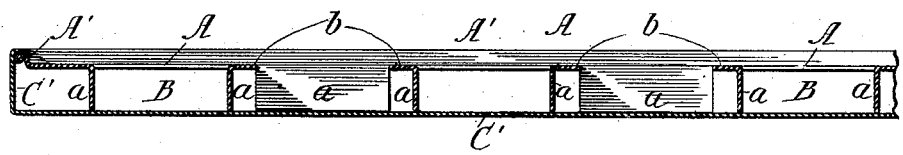

Figure 1 is a top or plan view showing a plate or sheet cut to be made into cells to receive the caramels; Fig. 2, a similar view with a modification in the cut; Fig. 3, a top or plan view showing the cut portions turned to form the cell or opening; Fig. 4, a sectional elevation with one caramel in place; Fig. 5, a top or plan view showing a modification in the cut for the turned portions; Fig. 6, a top or plan view showing the cells formed; Fig. 7, a sectional elevation with the form of cut shown in Fig. 5.

The figures represent a portion of the tray only. The tray is to be of the ordinary size of trays used for holding caramels and other candies.

This invention is primarily designed for the shipment and holding of caramels, but can be used for a similar purpose with other candies which are liable to adhere one piece to another when in contact, such candies being of the same general shape of caramels, and has for its object to enable caramels and other candies of an adhesive nature to be transported or shipped without becoming disfigured or ill-shaped or stuck one to the other, while at the same time the bottom or pan of the tray will serve as the receptacle from which the caramels or other candies can be sold; and its nature consists in a tray comprising a bottom or pan portion and a cell portion, the latter having a number of separate cells, and fitting within the bottom portion, and each cell forming a division by which its contents will be kept clear of the contents of the adjoining cells, as hereinafter more specifically described, and pointed out in the claims.

In the drawings, A represents a plate or sheet of zinc, tin, pasteboard, straw-board, or other suitable material that can be divided by cuts to have the cut portions turned to form cells. As shown in Fig. 1, the cuts are made so as to form triangular portions *a*, four pieces being formed for each square, the cuts running from the corner of each square diagonally to the center of the square, as shown in Fig. 2; or the quarters *a* for each square may have the points cut at the center meeting-place, so as to leave a square end, *a'*, as shown in Fig. 2. In the modification shown in Figs. 5, 6, 7 the cuts are made alternately for adjacent squares with a cut at each end and across the center transversely, and the adjacent squares with a cut at each side and across the square transversely, so that on each side of the transverse cut the pieces *a* can be turned down to stand at right angles, or nearly so, to the plate or sheet A.

B are the cells formed in the plate or sheet A by turning the ends or pieces *a* to stand at right angles, or nearly so, with the plate or sheet A, the pieces *a*, when turned, forming the walls of each cell, a cell being formed for each square, and the cells being separated or divided one from the other by strips *b*, left on the plate or sheet A by the turning of the ends or pieces *a*, to which strips the adjacent pieces or ends *a* are left joined in the cut of the plate or sheet A into squares.

C is the bottom or receiving pan for the plate or sheet A, made of zinc, tin, or other suitable material, and of a dimension for the plate or sheet to fit therein, the pan having side and end walls, C', to form a pan of the required depth for the caramels, and as shown the edge of the plate or sheet A is turned in at the sides and ends to form a flange, A', which flange acts to hold the plate or sheet steady and in place, and when the plate or sheet A is placed in the pan the edges *a'* of the ends or pieces *a* rest on the bottom of the pan, and furnish a support for the plate or sheet.

D is a caramel placed in a cell B, and supported by the bottom of the pan C and the walls *a* of the cell, the walls *a* forming the division by which one caramel is held out of contact with the adjacent caramels.

In use the plate A, with its cells B, formed therein by the walls *a*, is dropped into the pan C, and the caramels are placed one in each cell until all the cells are filled. A cover or top can then be placed over the pan C, and the receptacle as a whole shipped, and when the destination is reached the top or cover can be removed and the plate A withdrawn, leaving the caramels in the pan, to be handled by a scoop or otherwise. The caramels will be free one from the other, as they are divided one from the other by the walls $a$, and cannot come in contact, so that when shipped and sold the caramels will be as clear one from the other as if sold from the pan at the place made, and will not present an unsightly appearance from being jammed or crushed or stuck one to the other. The pans and trays can be emptied and filled until they become worn out.

The cells are formed, when made with a diagonal cut, by turning the quarters $a$ down, so that the four quarters form the four walls of the cell. In the modification shown in Fig. 5 two walls are formed by the cut portions of the opening, and the other two by the portion of the adjoining opening, the side walls being formed by one cut and the end walls by the cross-cut of the adjoining cells, as shown in Fig. 7; but with either form of cut intermediate walls or strips surround the caramels, separating one from the other.

What I claim as new, and desire to secure by Letters Patent, is—

1. The plate or sheet A, having cells B formed therein by pieces $a$, to receive and hold candies, substantially as and for the purpose specified.

2. The plate or sheet A, having cells B formed therein by pieces $a$, in combination with the pan C, for shipping and holding candies, substantially as specified.

PETER T. CRAMER.

Witnesses:
 ALBERT H. ADAMS,
 HARRY T. JONES.